US010893411B2

(12) United States Patent
Finger

(10) Patent No.: US 10,893,411 B2
(45) Date of Patent: Jan. 12, 2021

(54) SYSTEMS AND METHODS FOR REACTIVE REMOTE SIM UNLOCKING

(71) Applicant: T-Mobile USA, Inc., Bellevue, WA (US)

(72) Inventor: Joshua Finger, Covington, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/401,663

(22) Filed: May 2, 2019

(65) Prior Publication Data
US 2020/0351654 A1 Nov. 5, 2020

(51) Int. Cl.
*H04W 12/00* (2009.01)
*H04L 29/06* (2006.01)

(52) U.S. Cl.
CPC ..... *H04W 12/0027* (2019.01); *H04L 63/0892* (2013.01); *H04L 63/20* (2013.01); *H04W 12/0023* (2019.01); *H04W 12/00403* (2019.01)

(58) Field of Classification Search
CPC ....... H04W 12/0027; H04W 12/00403; H04W 12/0023; H04W 12/1206; H04W 12/00409; H04W 12/06; H04W 12/12; H04W 88/02; H04W 8/183; H04W 8/22; H04L 63/0892; H04L 63/20; H04L 63/0853; H04L 63/102; H04L 67/26; G06F 3/0484; H04M 1/67
USPC .......................................... 455/411; 715/753
See application file for complete search history.

(56) References Cited

U.S. PATENT DOCUMENTS

| 2004/0192388 | A1* | 9/2004 | Dupuis ................. H04W 8/205 455/558 |
| 2008/0005577 | A1* | 1/2008 | Rager ................... H04W 12/12 713/183 |
| 2008/0209206 | A1* | 8/2008 | Vaha-Sipila ........ H04L 63/0823 713/155 |
| 2010/0015949 | A1* | 1/2010 | Bradley ................ H04W 88/06 455/410 |
| 2012/0058743 | A1* | 3/2012 | Chen ..................... H04L 63/102 455/411 |
| 2012/0157055 | A1* | 6/2012 | Ren ..................... H04L 63/0853 455/411 |
| 2012/0220269 | A1* | 8/2012 | Feng ..................... H04W 12/08 455/411 |
| 2013/0210389 | A1* | 8/2013 | Obaidi .................. H04W 12/08 455/411 |
| 2014/0087790 | A1* | 3/2014 | Babbage ............... H04W 8/183 455/558 |
| 2015/0113442 | A1* | 4/2015 | Aghadavoodi Jolfaei .................. H04L 67/26 715/753 |
| 2015/0148007 | A1* | 5/2015 | Mitchell ........... H04W 12/1206 455/411 |

(Continued)

Primary Examiner — Nathan S Taylor
(74) Attorney, Agent, or Firm — Lee & Hayes, P.C.

(57) ABSTRACT

Systems and methods for remote SIM unlocking are disclosed. The systems and methods can include detecting that a user equipment is eligible to be unlocked. The unlocking of the user equipment may allow the use of the user equipment on another cellular network. An enterprise unlock server verifies eligibility with a policy engine, and if eligible, sends a push command to the user equipment to execute the unlock process. The user equipment, upon receipt of the command, initiates the unlock process. In some examples, the user equipment can prompt the enterprise unlock server to check if the user equipment is eligible.

21 Claims, 8 Drawing Sheets

(56) References Cited

U.S. PATENT DOCUMENTS

| | | | |
|---|---|---|---|
| 2016/0037344 A1* | 2/2016 | Kim | H04W 12/08 |
| | | | 455/411 |
| 2016/0100309 A1* | 4/2016 | Velusamy | H04W 12/08 |
| | | | 380/270 |
| 2016/0140358 A1* | 5/2016 | Lee | G06F 15/16 |
| | | | 726/7 |
| 2017/0085546 A1* | 3/2017 | Velusamy | H04L 63/08 |
| 2017/0288719 A1* | 10/2017 | Kovacevic | H04W 8/183 |
| 2020/0245128 A1* | 7/2020 | Obaidi | H04M 1/72577 |

* cited by examiner

SYSTEMS AND METHODS FOR REACTIVE REMOTE SIM UNLOCKING

BACKGROUND

Customers of a particular cellular carrier (or network) may purchase or use a phone from their cellular carrier under a contract. The use of the phone (or another communication-enabled device) under contract often means that, should the user switch to another carrier before the obligations under the contract are fulfilled by the user, the user cannot use that phone on another carrier's network without financial remuneration to the original cellular carrier. For example, the phone may be financed by the cellular carrier whereby the customer gets to use a new device while paying for the device over a period of months or years. In another example, a cellular carrier may offer a device free of charge as long as the customer stays a customer on the network for a certain period of time.

If a customer changes their cellular carrier while the use of the phone is still under contract, the phone is often "locked," preventing the use of the phone on another carrier's network. In order to use the device, often a subscriber identity module ("SIM" or "SIM card") used with the device and issued by the original carrier must receive an unlock communication from the carrier to unlock the phone. As is well-known, a SIM card is an integrated circuit that has stored thereon various pieces of information, including the phones' international mobile subscriber identity (IMSI) number and a personal unblocking code ("PUC") to be used to unlock the phone to allow the use of the phone on another carrier.

Conventional unlocking procedures are typically standard across carriers. A user that wishes to use their phone on another carrier sends an unlock request to the carrier to unlock the phone. The carrier checks a policy engine, which is a database of information from which unlock eligibility may be determined. If the phone is eligible to be unlocked, the carrier will transmit to the user a personal identification number ("PIN") or unlock code that, when entered, unlocks the phone so that the phone may be used on other networks.

In some examples, there can be disadvantages with conventional unlocking procedures and technologies. For example, the user may have already switched carriers, meaning that the phone they would like unlocked is no longer able to connect to the carrier they left and cannot connect to the new carrier. Thus, the user may have to use an outside line (such as another cell phone or a landline) to call customer service of the recently left carrier to request the unlocking of the phone.

Further, the carrier from which the user left must expend resources and time (e.g. the customer care line or an interactive voice response ("IVR") system) on a non-paying former customer. Additionally, because the carrier from which the user left no longer has the number in the carrier's database, the ability to search for and send an unlock PIN may be difficult. Finally, because the carrier from which the user left may not have subscription details of the new carrier's subscription, the former carrier may not be able to guarantee that a text message having an unlock PIN may not be charged as a cost by the new carrier.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Examples of the present disclosure can comprise systems and methods for remote SIM unlocking to enable a communication device (user equipment) to be used on a different cellular carrier. The system can act in a "push" mode, whereby the network detects conditions are met to unlock the device and pushes an unlock command to the phone. The system can also act in a "pull" mode, whereby an application on the device detects a requirement to unlock the communication to enable the use of the communication device.

Figure 1:
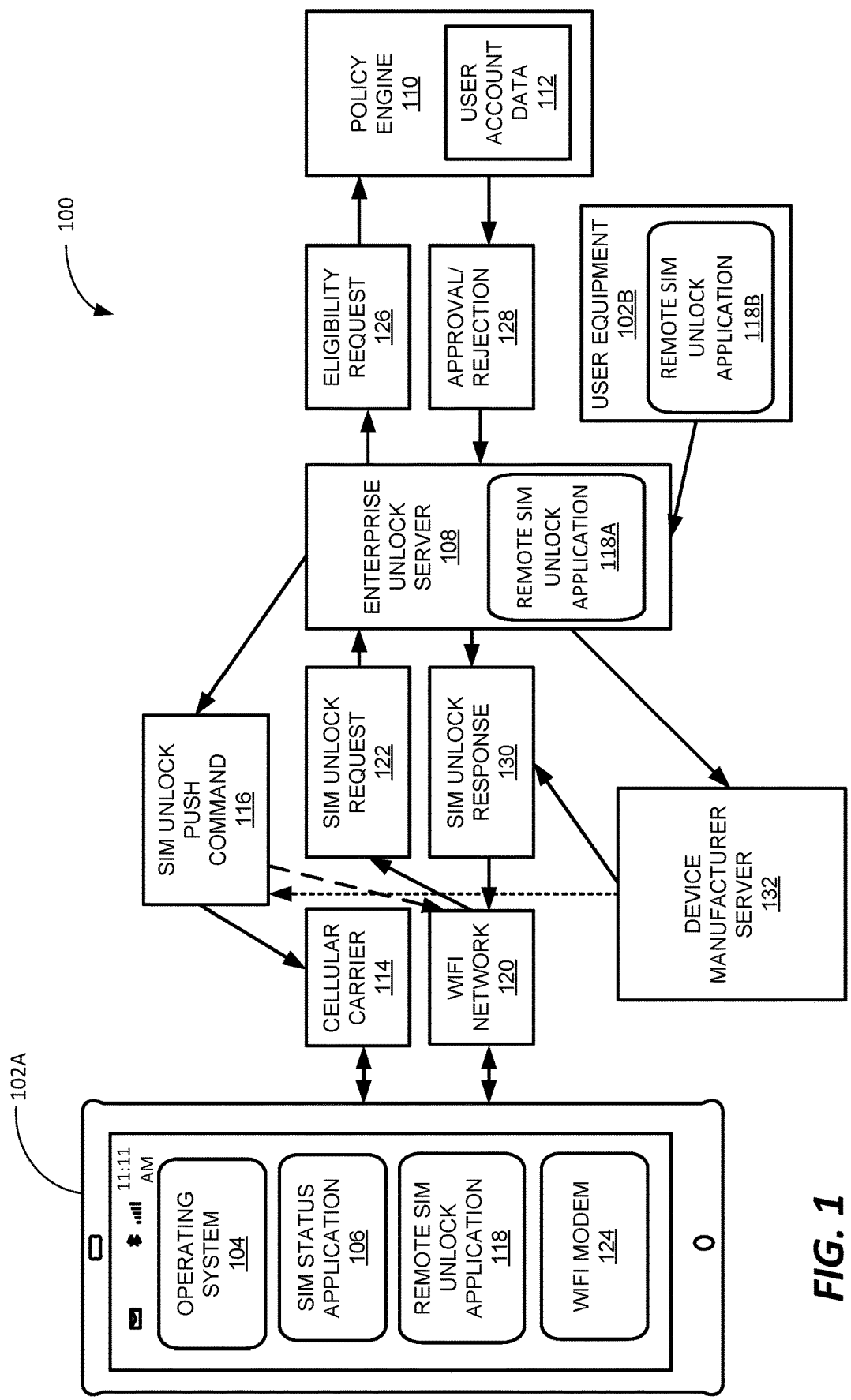
FIG. 1 depicts an example of a system for reactive remote SIM card unlocking, in accordance with some examples of the present disclosure.

FIG. 1 is an example system 100 configured to provide remote SIM unlocking, in accordance with some examples of the present disclosure. Illustrated in FIG. 1 is a user equipment (UE) 102A capable of receiving and sending communications. The UE 102A may include, but is not cellphones, tablets, or laptop computers. The UE 102A has stored therein an operating system (OS) 104. The OS 104 is a computer program stored in a memory (not shown) of the UE 102A that controls the operation of the UE 102A. In the example illustrated in FIG. 1, the UE 102A is a lockable device. As noted above, a lockable device is a communication device that is "locked" for use with a particular cellular carrier (or network). If a SIM card (or other means of enabling communication) issued by the cellular carrier that locked the communication device is changed to a SIM card from a different cellular carrier, the locked status of the communication device may prevent the use of the communication device with the new cellular carrier.

As noted above, the system 100 may be capable of a pull operation, whereby the UE 102A is requesting that the UE 102A be unlocked for use. The unlock/lock status of the UE 102A is determined by a SIM status application 106. The SIM status application 106 accesses and controls the SIM status of the UE 102A and provides that information to, among other applications, the OS 104 to determine the operation of the UE 102A. For example, the SIM status application 106 may have three SIM states stored in memory: 00—meaning the UE 102A is locked; 01—meaning the UE 102A is unlocked; and 11—meaning the UE 102A is temporarily unlocked. When a user of the UE 102A attempts to make a call using the UE 102A, the SIM status application 106 may be accessed and provide the unlock status to the OS 104, either preventing or allowing the call to be made.

Thus, in this example, in order to unlock a locked UE 102A, the UE 102A may need to receive an instruction to cause the SIM status application 106 to change the SIM state stored in memory from locked to unlocked. In the push example, an enterprise unlock server 108 has received or determines information that the UE 102A is to be unlocked. In this example, the enterprise unlock server 108 may have received information from a policy engine 110 that the UE 102A has met certain unlock criteria based on information in a user account data 112 for the UE 102A. Some of the conditions may include, but are not limited to, payment in full of the UE 102A if financed, the UE 102A is subscribed to a cellular carrier 114 for a particular period of time, or other requirements. The presently disclosed subject matter is not limited to any particular requirement.

If the enterprise unlock server 108 determines that the UE 102A is to be unlocked, or, receives an instruction that the UE 102A is to be unlocked, the enterprise unlock server 108 may transmit a SIM unlock push command 116 through the cellular carrier 114 to a remote SIM unlock application 118 operating on the UE 102A. It should be noted that the SIM push command 116 may be sent from another component or system of a cellular carrier 114 (or another system) or may be transmitted using other communication methods, such as transmission using a Wifi network 120 in communication with the UE 102A. The presently disclosed subject matter is not limited to the source of the SIM unlock push command 116, the entity or system from which the SIM unlock push command 116 is transmitted, or the type of communication network over which the SIM unlock push command 116 is transmitted.

In some examples, a remote SIM unlock application may be executed on other devices to allow a user to perform a remote SIM unlock operation in other manners. For example, a remote SIM unlock application 118A, having similar functionality to the remote SIM unlock application 118, may be executed by the enterprise unlock server 108. In this example, the remote SIM unlock application 118A may be a "cloud-based" or Internet-based solution, whereby a user can access the functionality of the remote SIM unlock application 118A in various ways, such as, but not limited to, a secure login to a website. In another example, a remote SIM unlock application 118B, having functionality similar to the remote SIM unlock application 118, may be used by a user on a user equipment 102B. In some examples, the user equipment 102B may be a device separate from the user equipment 102A, such as, but not limited to, an different cellular telephone, a computer, a tablet, or other devices capable of establishing communication with the enterprise server 108. In this example, the remote SIM unlock application 118B may be a locally executed application.

The remote SIM unlock application 118 is an application executing on the UE 102A that is used by the UE 102A to receive commands, such as the SIM unlock push command 116, to determine a lock status of the UE, as well as other functionality. In the instances of the receipt of the SIM unlock push command 116, the remote SIM unlock application 118 accesses the SIM status application 106 and instructs the SIM status application 106 to change the unlock status of the UE 102A based on the SIM unlock push command 116. In some examples, the remote SIM unlock application 118 may access and instruct the SIM status application 106 to unlock the UE 102A without requiring any input or permission from a user of the UE 102A. In other instances, when the remote SIM unlock application 118 receives the SIM unlock push command 116, the remote SIM unlock application 118 may initiate a user interface (described below) in which a user is presented with a selectable link to accept, reject, and/or hold for a future choice, such as a date or time, the SIM unlock push command 116, thus providing a user with the ability to control the unlock status rather than having it occur automatically. In either instance, the user may be provided with information that the UE 102A is unlocked.

In a "pull" operation, the UE 102A transmits a SIM unlock request 122 to the enterprise unlock server 108. The SIM unlock request 122 may be the result of various conditions of the UE 102A. For example, a user of the UE 102A may have switched a SIM card (not shown) of the UE 102A from the cellular carrier 114 to a SIM card issued by another cellular carrier (not shown). When attempting to place a call (or other conditions as may occur), the UE 102A may access the SIM status application 106 to determine the unlock/lock condition of the UE 102A to determine if the new SIM card can be used with the UE 102A. If the status indicates that the UE 102A is locked and is not allowed to operate on the new cellular carrier, the operating system 104 of the UE 102A may instruct the remote SIM unlock application 118 to transmit the SIM unlock request 122 to unlock the phone. In some examples, the remote SIM unlock application 118 may operate without user interaction, and in other examples, the remote SIM unlock application 118 may operate with partial or full user interaction.

As noted above, because the UE 102A is no longer associated with the cellular carrier 114, the UE 102A may not be able to transmit the SIM unlock request 122 over the cellular carrier 114 or the new cellular carrier. Thus, in this example, the UE 102A may attempt to connect to the Wifi network 120 using the Wifi modem 124. The connection to the Wifi network 120 may be done without user interaction or as a result of an input received from a user. When connected to the Wifi network 120, the SIM unlock request 122 is transmitted to the enterprise unlock server 108. Upon receipt of the SIM unlock request 122, the enterprise unlock server 108 transmits an eligibility request 126 to the policy engine 110.

Part of the eligibility request 126 includes information specific to the UE 102A that can be used to identify the UE 102A. For example, the eligibility request 126 may include the international mobile subscriber identity of the UE 102A. The policy engine 110 accesses the user account data 112, and, using the IMSI or other information, such as an international mobile equipment identity ("IMEI"), determines if the UE 102A is eligible to be unlocked. The policy engine 110 issues an approval/rejection 128, with the approval indicating that the UE 102A is eligible for unlocking and the rejection indicating that the UE 102A is not eligible for unlocking. If the enterprise unlock server 108 receives an approval 128, the enterprise unlock server 108 transmits a SIM unlock response 130 that instructs the UE 102A to have the SIM status application 106 modify the status of the UE 102A from a locked state to an unlocked state.

In some examples, the "user experience" of the UE 102A may be controlled by a third-party server, such as a server of the manufacturer of the UE 102A. In the example illustrated in FIG. 1, a device manufacturer server 132 controls the configuration associated with the UE 102A rather than the enterprise unlock server 108 associated with the cellular carrier 114. In those examples, the enterprise unlock server 108 may inform the device manufacturer server 132 that the UE 102A is eligible for unlocking. The device manufacturer 132 may then, if acceptable to the device manufacturer server 132, issue the SIM unlock response 130. Once unlocked, the user may then restart the UE 102A to finalize the unlocking process. In some examples, the remove SIM unlock application 118 may be installed on the UE 102A as a permanent application. In other examples, the SIM unlock application 118 may be downloaded and installed on the UE 102A. If downloaded, the installation of the new SIM card may prompt the user to connect to the Wifi network 120 and download/install the remote SIM unlock application 118.

In some examples, a user may access the remote SIM unlock application 118 and request that the UE 102A be unlocked. The user may do this prior to inserting a SIM card issued by a new cellular carrier. If the unlock process is initiated before the new SIM card is installed, the unlock process may be carried out either using the cellular carrier 114 (assuming the user still has an active subscription) or the Wifi network 120.

Figure 2:
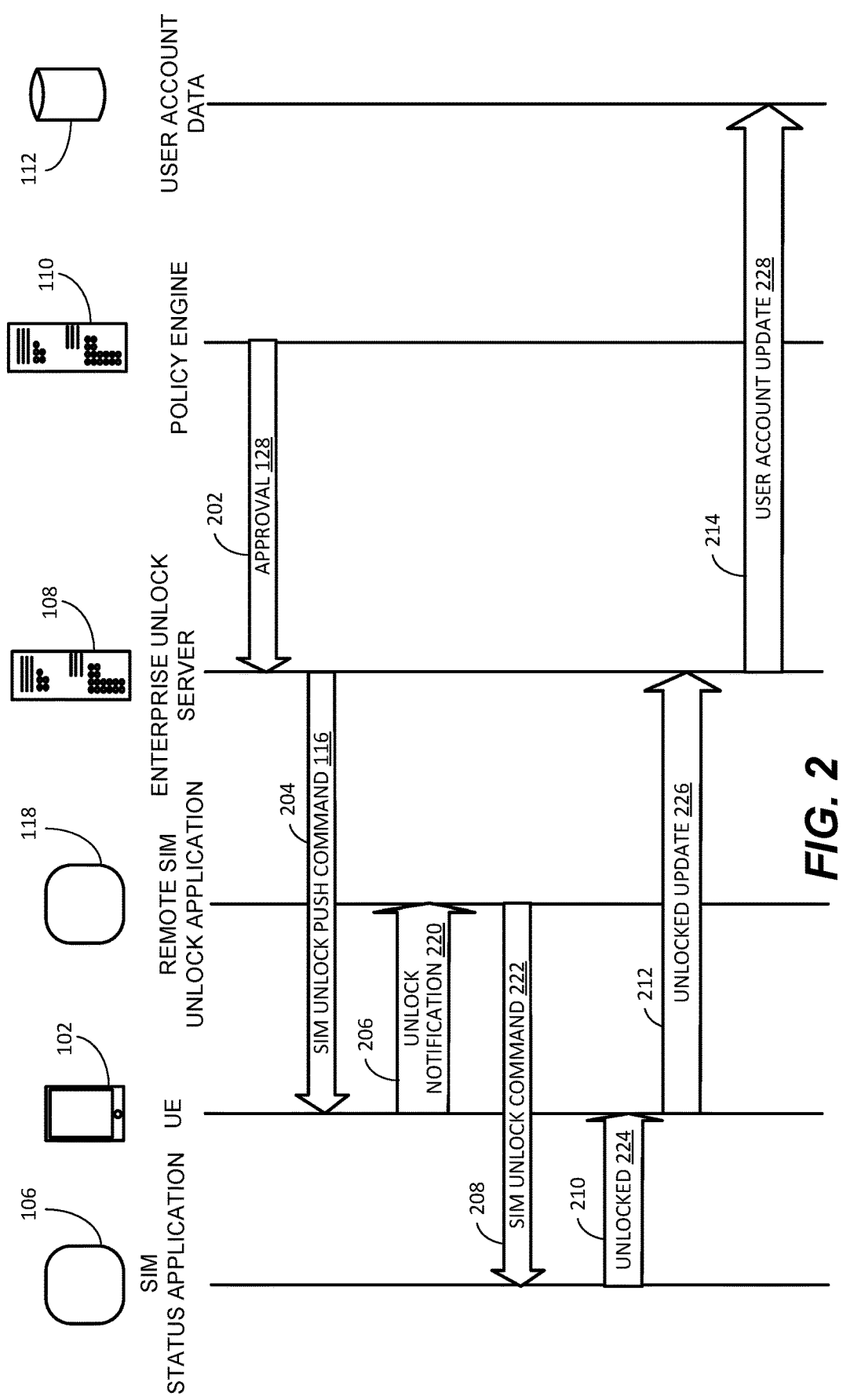
FIG. 2 is an example signal flow for the system of FIG. 1 in a remote SIM unlock push operation, in accordance with some examples of the present disclosure.

FIG. 2 is an example signal flow diagram for the system of FIG. 1 in a remote SIM unlock push operation, in accordance with some examples of the present disclosure. As noted above, in some examples, a remote SIM unlock push operation is commenced by a component of the cellular carrier 114, such as the policy engine 110 or the enterprise unlock server 108. In the example illustrated in FIG. 2, the origin of the unlock request comes from the policy engine 110.

In FIG. 2, at 202, the policy engine 110 transmits the approval 128 at 202. As noted above, the approval 128, or the push operation in general, may be commenced based on different reasons. For example, the policy engine 110 may determine that the cost of the UE 102A has been paid in full according to the user account data 112. In another example, the policy engine 110 may determine that the UE 102A has been associated and subscribed to the cellular carrier 114 for a certain number of days. The approval 128 may be generated for other reasons not specifically described herein.

At 204, the enterprise unlock server 108 transmits the SIM unlock push command 116 to the UE 102A. If the UE 102A is capable of using the cellular carrier 114, the SIM unlock push command 116 may be transmitted over the cellular carrier 114. If the UE 102A is not capable of using the cellular carrier 114, the SIM unlock push command 116 may be transmitted over the Wifi network 120. Other types of communication means may be used and are considered to be within the scope of the presently disclosed subject matter.

At 206, the UE 102A issues an unlock notification 220 to the remote SIM unlock application 118 indicating the UE 102A has received instructions to unlock the UE 102A. At 208, the remote SIM unlock application 118 sends to the SIM status application 106 a SIM unlock command 222. The SIM unlock command 222 is an instruction to have the SIM status application 106 change the unlock status of the UE 102A from locked to unlocked. In some examples, the SIM unlock command 222 is transmitted at 208 without requesting permission from a user. In other examples, the user is provided an indication of the receipt of the SIM unlock push command 116 and a selectable link in a user interface (explained in more detail below). The user can give the remote SIM unlock application 118 permission to proceed, deny the unlock command, or instruct the UE 102A to wait to unlock the UE 102A until a later time.

At 210, after the SIM status application 106 changes the status of the UE 102A from locked to unlocked, the SIM status application sends an unlocked indication 224 to the UE 102A. At 212, the UE 102A sends an unlocked update 226 to the enterprise unlock server 108. At 214, the enterprise unlock server 108 updates the user account data 112 by providing a user account update 228 to the user account data 112.

Figure 3:
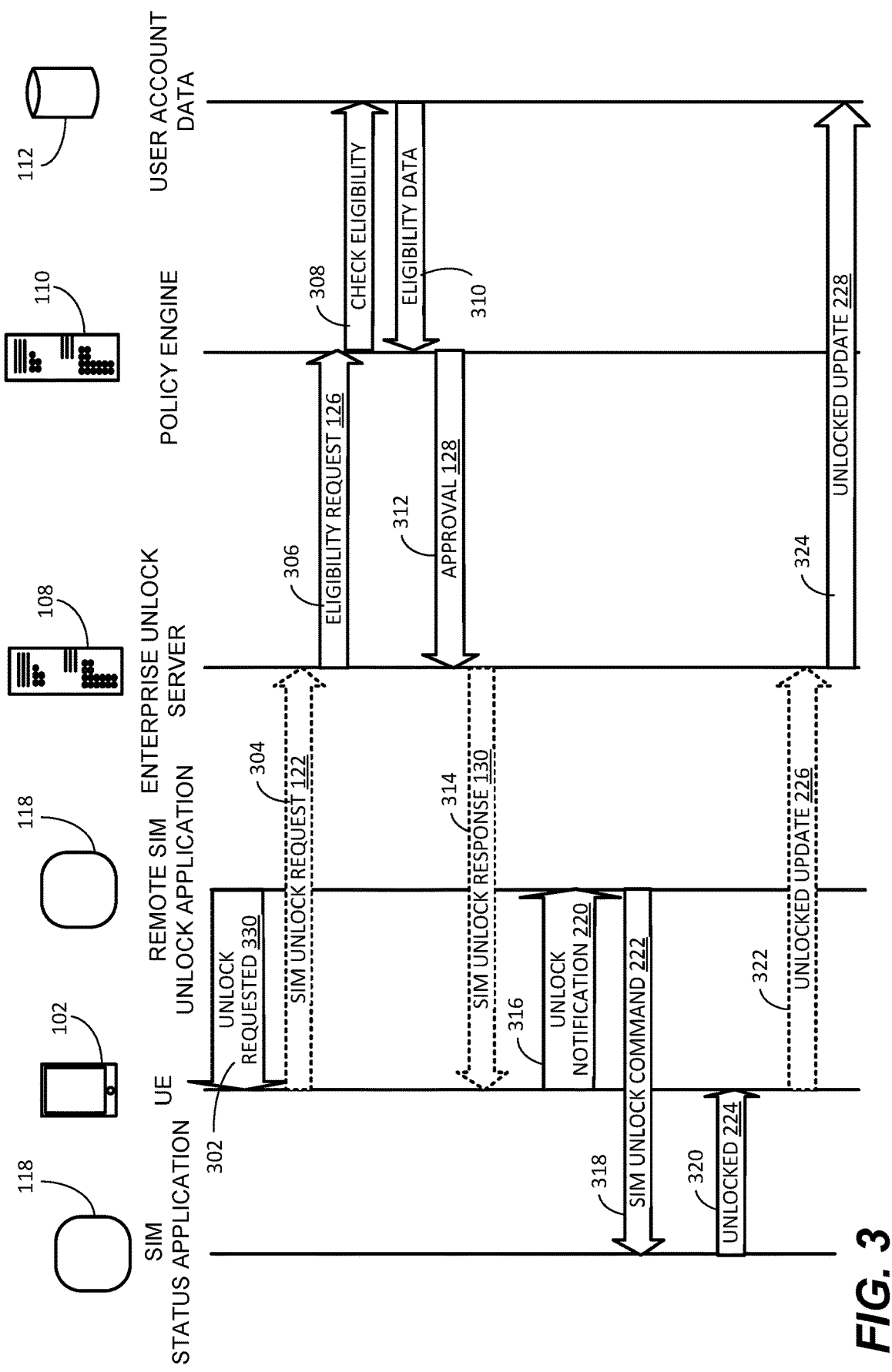
FIG. 3 is an example signal flow for the system of FIG. 1 in a SIM unlock pull operation, in accordance with some examples of the present disclosure.

FIG. 3 is an example signal flow for the system of FIG. 1 in a SIM unlock pull operation, in accordance with some examples of the present disclosure. As noted above, in some examples, a remote SIM unlock pull operation is commenced by a user of the UE 102A or an action (such as a different SIM card) involving the UE 102A.

In FIG. 3, an unlock requested 330 instruction is received from the remote SIM unlock application 118. The unlock requested 330 instruction may be received for various reasons including, but not limited to, a user requesting that the UE 102A be unlocked, the replacement of a SIM card issued by the cellular carrier 114 with a SIM card not issued by the cellular carrier 114.

At 304, the UE transmits a SIM unlock request 122 to the enterprise unlock server 108. As noted above, the UE 102A may be incapable of using the cellular carrier 114, and thus, may need to connect to and use the Wifi network 120. This is represented by dotting lines rather than solid lines. It should be understood, however, that in some examples the UE 102A may be capable of using the cellular carrier 114, and thus, may communicate in that manner rather than using the Wifi network 120.

At 306, the enterprise unlock server 108 sends the eligibility request 126 to the policy engine 110. The eligibility request 126 includes information relating to the user and/or the UE 102A, such as the IMSI or other identifying information.

At 308, the policy engine 110 checks with the user account data 112 to determine eligibility for unlocking. At 310, the policy engine 110 receives eligibility data from the user account data 112 and approves or disapproves the SIM unlock request 122.

At 312, the approval 128 is transmitted to the enterprise unlock server 108. As noted above, the approval 128 may be granted based on different reasons. For example, the policy engine 110 may determine that the cost of the UE 102A has been paid in full according to the user account data 112. In another example, the policy engine 110 may determine that the UE 102A has been associated and subscribed to the cellular carrier 114 for a certain number of days. The approval 128 may be generated for other reasons not specifically described herein.

At 314, the enterprise unlock server 108 transmits the SIM unlock response 130 to the UE 102A. If the UE 102A is capable of using the cellular carrier 114, the SIM unlock response 130 may be transmitted over the cellular carrier 114. If the UE 102A is not capable of using the cellular carrier 114, the SIM unlock response 130 may be transmitted over the Wifi network 120. Other types of communication means may be used and are considered to be within the scope of the presently disclosed subject matter.

At 316, the UE 102A issues an unlock notification 220 to the remote SIM unlock application 118 indicating the UE 102A has received instructions to unlock the UE 102A. At 318, the remote SIM unlock application 118 sends to the SIM status application 106 a SIM unlock command 222. The SIM unlock command 222 is an instruction to have the SIM status application 106 change the unlock status of the UE 102A from locked to unlocked. In some examples, the SIM unlock command 222 is transmitted at 318 without requesting permission from a user. In other examples, the user is provided an indication of the receipt of the SIM unlock push command 116 and a selectable link in a user interface (explained in more detail below). The user can give the remote SIM unlock application 118 permission to proceed, deny the unlock command, or instruct the UE 102A to wait to unlock the UE 102A until a later time.

At 320, after the SIM status application 106 changes the status of the UE 102A from locked to unlocked, the SIM status application sends an unlocked indication 224 to the UE 102A. At 322, the UE 102A sends an unlocked update 226 to the enterprise unlock server 108. At 324, the enterprise unlock server 108 updates the user account data 112 by providing a user account update 228 to the user account data 112.

Figure 4:
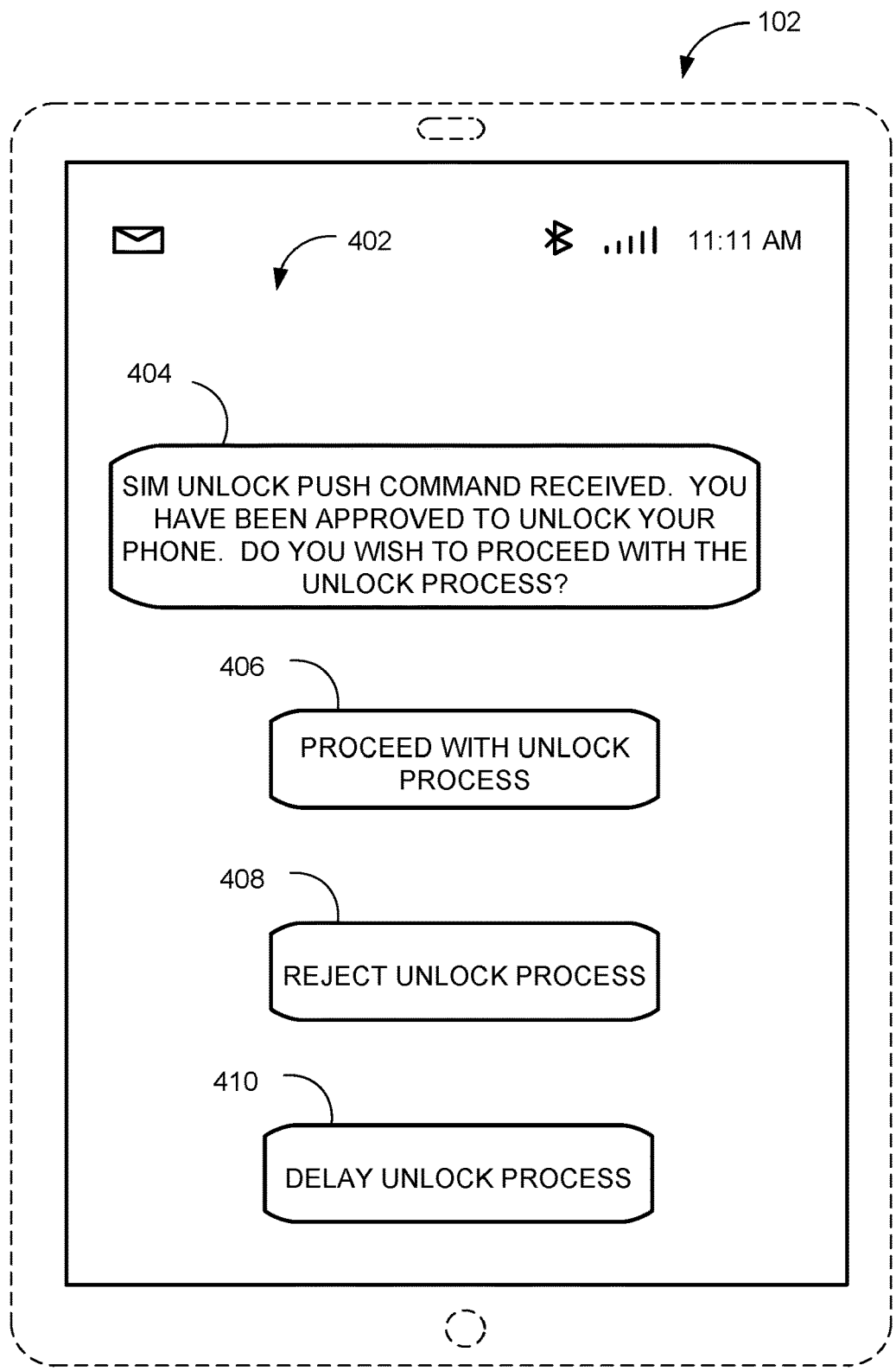
FIG. 4 is an example SIM unlock user interface for a remote SIM unlock push operation, in accordance with some examples of the present disclosure.

FIG. 4 is an example SIM unlock user interface 402 for a remote SIM unlock push operation, in accordance with some examples of the present disclosure. As noted above, even though FIG. 4 illustrates an example of an aspect of an unlocking process with user interaction, the unlocking process can occur without user interaction. In FIG. 4, the UE 102A has displayed thereon the SIM unlock user interface 402. The SIM unlock user interface 402 may be rendered by the UE 102A in response to the receipt of the SIM unlock push command 116 at 204 in FIG. 2. The SIM unlock user interface 402 includes a notification 404 indicating that the UE 102A has received the SIM unlock push command 116, indicating that the UE is eligible for unlocking.

The SIM unlock interface 402 further includes selectable link 406, selectable link 408, and selectable link 410. The selectable links 406-410 are links that are configured to receive an input instructing the UE 102A how to proceed. The selection of which of the selectable links 406-410 instructs the remote SIM unlock application 118 on how to proceed. As illustrated, if an input is received through selectable link 406, the unlock process proceeds, if an input is received through selectable link 408, the unlock process is stopped, and if an input is received through selectable link 410, the unlock process is delayed until a later time.

Figure 5:
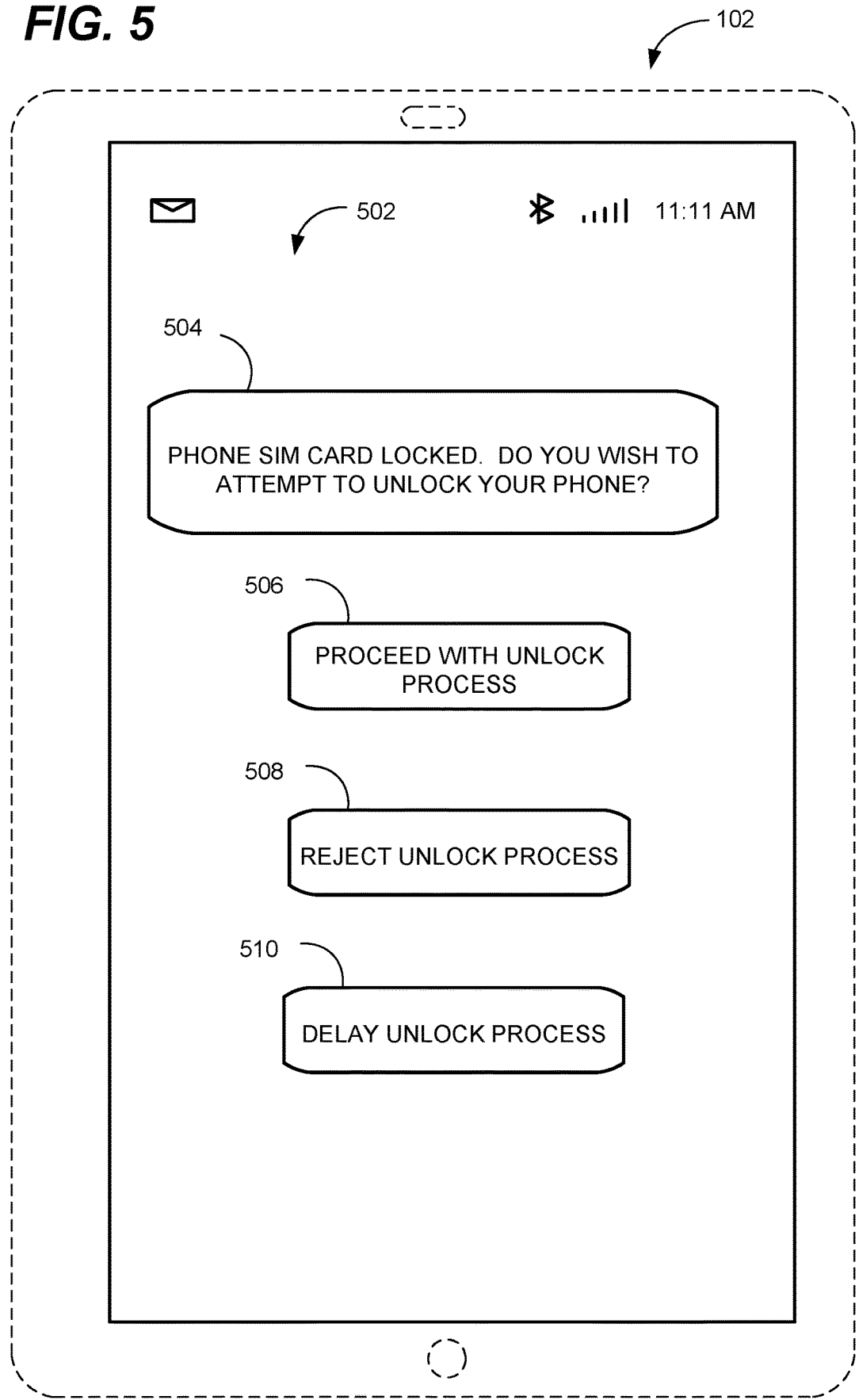
FIG. 5 is an example SIM unlock user interface for a remote SIM unlock pull operation, in accordance with some examples of the present disclosure.

FIG. 5 is an example SIM unlock user interface 502 for a remote SIM unlock pull operation, in accordance with some examples of the present disclosure. As noted above, even though FIG. 5 illustrates an example of an aspect of an unlocking process with user interaction, the unlocking process can occur without user interaction. In FIG. 5, the UE 102A has displayed thereon the SIM unlock user interface 502. The SIM unlock user interface 502 may be rendered by the UE 102A in response to a detection of a new SIM card for a new cellular carrier, by request of a user of the UE 102A, or other examples. The SIM unlock user interface 502 includes a notification 504 indicating, in this example, that the phone is locked and querying whether or not a user wishes to unlock the phone. The SIM unlock interface 502 further includes selectable link 506, selectable link 508, and selectable link 510. The selectable links 506-510 are links that are configured to receive an input instructing the UE 102A how to proceed. The selection of which of the selectable links 406-410 instructs the remote SIM unlock application 118 on how to proceed. As illustrated, if an input is received through selectable link 506, the unlock process proceeds, if an input is received through selectable link 508, the unlock process is stopped, and if an input is received through selectable link 510, the unlock process is delayed until a later time.

Figure 6:
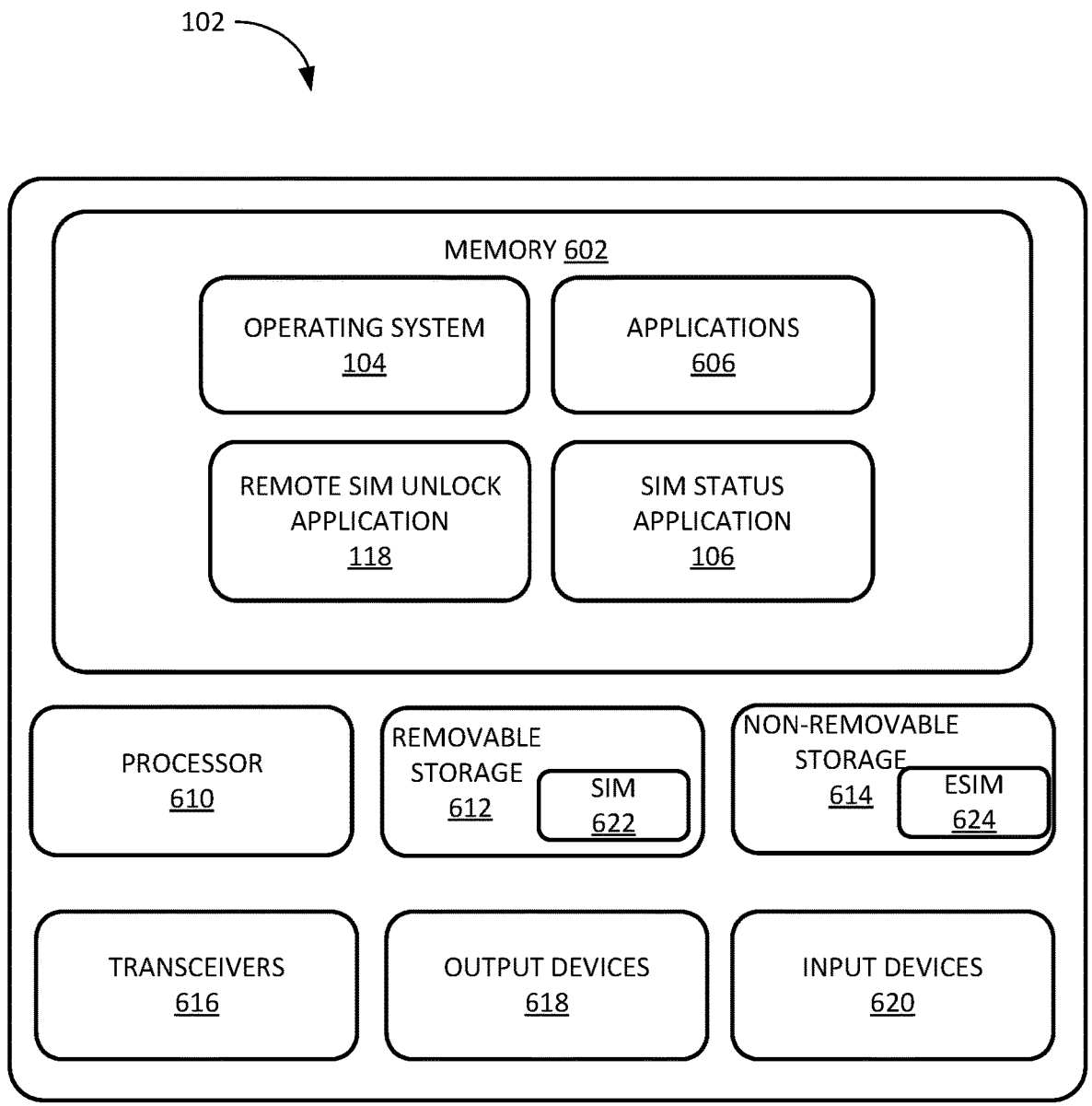
FIG. 6 is an example of a user equipment (UE) for use with the systems and methods disclosed herein, in accordance with some examples of the present disclosure.

FIG. 6 depicts a component level view of the UE 102A for use with the system 100 and methods described herein. The UE 102A could be any UE capable of using HTTP and Web Sockets. For clarity, the UE 102A is described herein generally as a cell phone, smart phone, or laptop computer. One of skill in the art will recognize, however, that the system 100 and methods described herein can also be used with a variety of other electronic devices, such as, for example, tablet computers, desktops, and other network (e.g., cellular or IP network) connected devices. Indeed, the UE 102A can be any device that can access the enterprise unlock server 108 via the Internet.

The UE 102A can comprise several components to execute the above-mentioned functions. As discussed below, the UE 102A can each comprise memory 602 including the operating system 104 and one or more standard applications 606, such as the SIM status application 106. The standard applications 606 can include many features common to UE such as, for example, contacts, calendars, call logs, voicemail, etc. In this case, the UE 102A can also comprise the remote SIM unlock application 118, among other things.

The UE 102A can also comprise one or more processors 610 and one or more of removable storage 612, non-removable storage 614, transceiver(s) 616, output device(s) 618, and input device(s) 620. In some examples, such as for cellular communication devices, the UE 102A can also include a SIM 622 and/or an eSIM 624, which can include a mobile country code (MCC), mobile network code (MNC), international mobile subscriber identity (IMSI), and other relevant information. In some examples, one or more of the functions (e.g., standard applications 606) can be stored on the SIM 622 or the eSIM 624 in addition to, or instead of, being stored in the memory 602. In various implementations, the memory 602 can be volatile (such as random-access memory (RAM)), non-volatile (such as read only memory (ROM), flash memory, etc.), or some combination of the two.

The memory 602 can also include the operating system 104. Of course, the operating system 104 varies depending on the manufacturer of the UE 102A and currently comprises, for example, iOS 11.4.1 for Apple products and Pie for Android products. The operating system 104 contains the modules and software that support a UE's basic functions, such as scheduling tasks, executing applications, and controlling peripherals.

The UE 102A can also comprise one or more processors 610. In some implementations, the processor(s) 610 can be a central processing unit (CPU), a graphics processing unit (GPU), both CPU and GPU, or any other processing unit. The UE 102A may also include additional data storage devices (removable and/or non-removable) such as, for example, magnetic disks, optical disks, or tape. Such additional storage is illustrated in FIG. 6 by removable storage 612 and non-removable storage 614. The removable storage 612 and non-removable storage 614 can store some, or all, of the remote SIM unlock application 118 and/or the SIM status application 106.

Non-transitory computer-readable media may include volatile and nonvolatile, removable and non-removable tangible, physical media implemented in technology for storage of information, such as computer readable instructions, data structures, program modules, or other data. The memory 602, removable storage 612, and non-removable storage 614 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the UE 102A. Any such non-transitory computer-readable media may be part of the UE 102A or may be a separate database, databank, remote server, or cloud-based server.

In some implementations, the transceiver(s) 616 include any transceivers known in the art. In some examples, the transceiver(s) 616 can include wireless modem(s) to facilitate wireless connectivity with other components, the Internet, and/or an intranet via the cellular and IP networks. Further, the transceiver(s) 616 may include a radio transceiver that performs the function of transmitting and receiving radio frequency communications via an antenna. In other examples, the transceiver(s) 616 may include wired communication components, such as a wired modem or Ethernet port, for communicating via one or more wired networks.

In some implementations, the output device(s) 618 include any output devices known in the art, such as a display (e.g., a liquid crystal or thin-film transistor (TFT) display), a touchscreen, speakers, a vibrating mechanism, or a tactile feedback mechanism. In some examples, the output device(s) 618 may play a different sound or display a different graphic depending on whether the SIM unlock response 130 is received or a rejection 128 is received. Output device(s) 618 can also include ports for one or more peripheral devices, such as headphones, peripheral speakers, or a peripheral display.

In various implementations, input device(s) 620 include any input devices known in the art. For example, the input device(s) 620 may include a camera, a microphone, or a keyboard/keypad. The input device(s) 620 can include the touch-sensitive display or a keyboard. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like.

Figure 7:
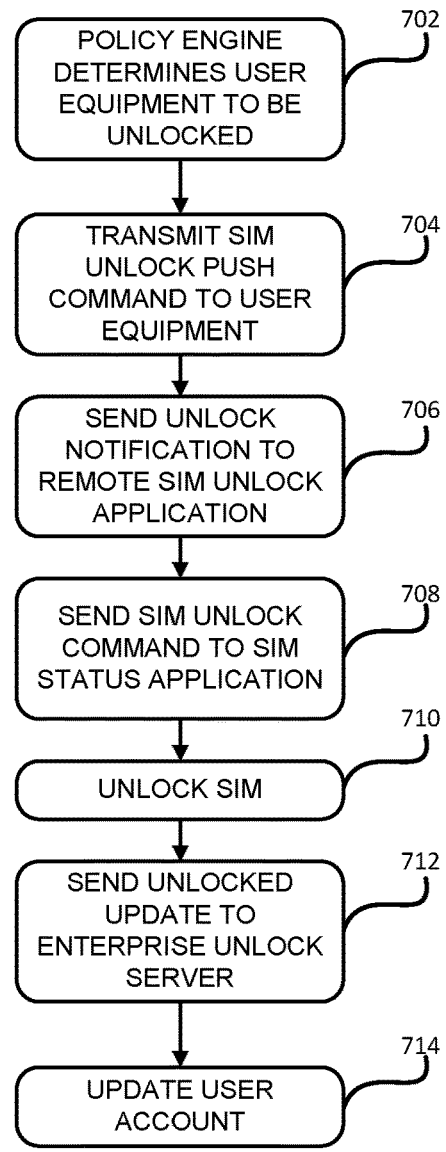
FIG. 7 is a flowchart depicting an example of a push method for remote SIM unlocking, in accordance with some examples of the present disclosure.

FIG. 7 is an illustrative process 700 for remote SIM unlocking in a push configuration, in accordance with some examples of the present disclosure. The process and other processes described herein are illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Referring to FIG. 7, the process 700 commences at operation 702, where the policy engine 110 transmits the approval 128. As noted above, the approval 128, or the push operation in general, may be commenced based on different reasons. For example, the policy engine 110 may determine that the cost of the UE 102A has been paid in full according to the user account data 112. In another example, the policy engine 110 may determine that the UE 102A has been associated and subscribed to the cellular carrier 114 for a certain number of days. The approval 128 may be generated for other reasons not specifically described herein.

At operation 704, the enterprise unlock server 108 transmits the SIM unlock push command 116 to the UE 102A. If the UE 102A is capable of using the cellular carrier 114, the SIM unlock push command 116 may be transmitted over the cellular carrier 114. If the UE 102A is not capable of using the cellular carrier 114, the SIM unlock push command 116 may be transmitted over the Wifi network 120. Other types of communication means may be used and are considered to be within the scope of the presently disclosed subject matter.

At operation 706, the UE 102A issues an unlock notification 220 to the remote SIM unlock application 118 indicating the UE 102A has received instructions to unlock the UE 102A.

At operation 708, the remote SIM unlock application 118 sends to the SIM status application 106 a SIM unlock command 222. The SIM unlock command 222 is an instruction to have the SIM status application 106 change the unlock status of the UE 102A from locked to unlocked. In some examples, the SIM unlock command 222 is transmitted at 708 without requesting permission from a user. In other examples, the user is provided an indication of the receipt of the SIM unlock push command 116 and a selectable link in a user interface. The user can give the remote SIM unlock application 118 permission to proceed, deny the unlock command, or instruct the UE 102A to wait to unlock the UE 102A until a later time.

At operation 710, after the SIM status application 106 changes the status of the UE 102A from locked to unlocked, the SIM status application sends an unlocked indication 224 to the UE 102A.

At operation 712, the UE 102A sends an unlocked update 226 to the enterprise unlock server 108.

At operation 714, the enterprise unlock server 108 updates the user account data 112 by providing a user account update 228 to the user account data 112.

Figure 8:
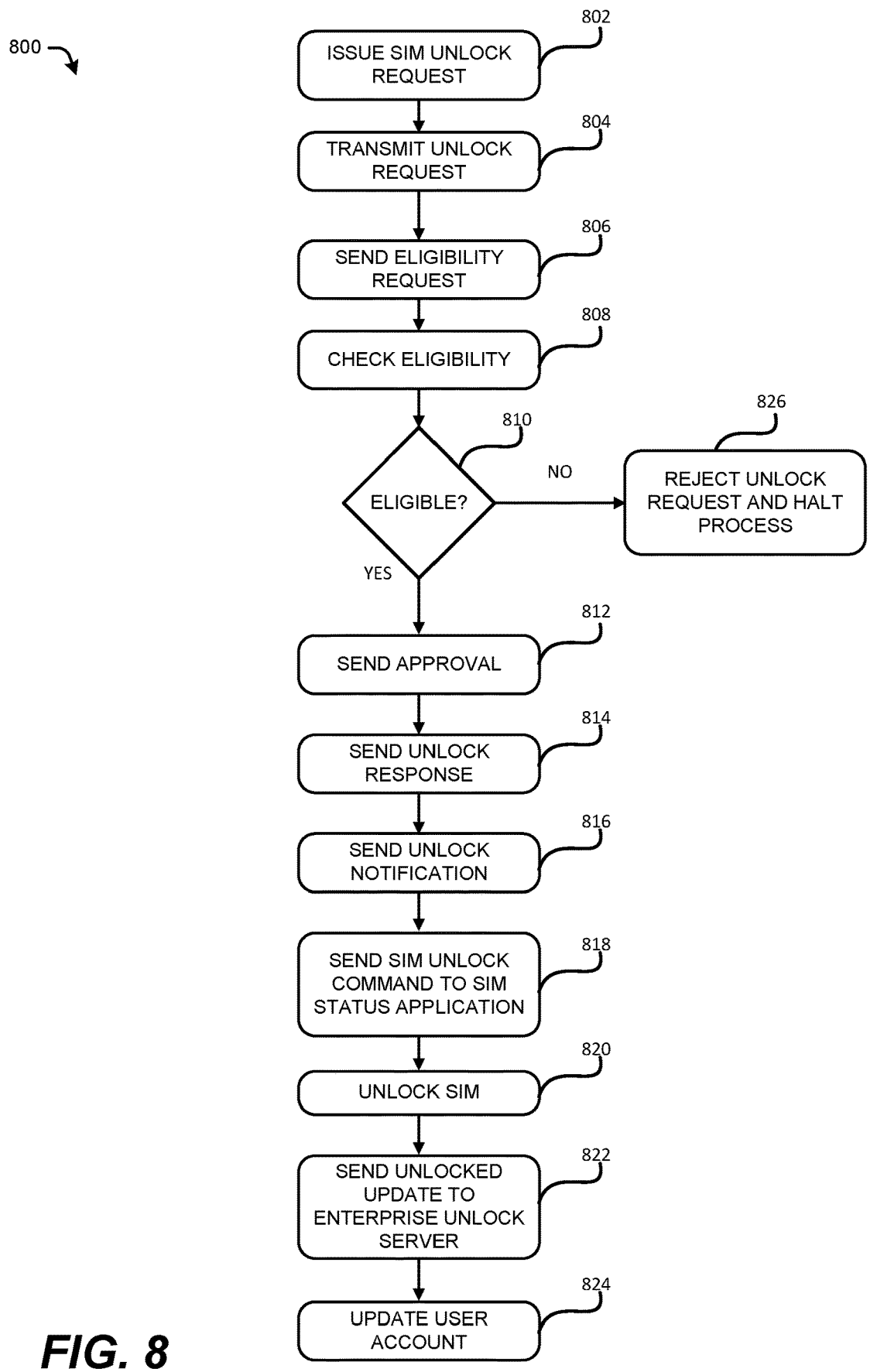
FIG. 8 is a flowchart depicting an example of a pull method for remote SIM unlocking, in accordance with some examples of the present disclosure.

FIG. 8 is an illustrative process 800 for remote SIM unlocking in a pull configuration, in accordance with some examples of the present disclosure. As noted above, in some examples, a remote SIM unlock pull operation is commenced by a user of the UE 102A or an action (such as a different SIM card) involving the UE 102A.

At operation 802, the remote SIM unlock application 118 issues the unlock requested 330 instruction. The unlock requested 330 instruction may be generated and transmitted for various reasons including, but not limited to, a user requesting that the UE 102A be unlocked, the replacement of a SIM card issued by the cellular carrier 114 with a SIM card not issued by the cellular carrier 114.

At operation 804, the UE transmits a SIM unlock request 122 to the enterprise unlock server 108. As noted above, the UE 102A may be incapable of using the cellular carrier 114, and thus, may need to connect to and use the Wifi network 120. It should be understood, however, that in some examples the UE 102A may be capable of using the cellular carrier 114, and thus, may communicate in that manner rather than using the Wifi network 120.

At operation 806, the enterprise unlock server 108 sends the eligibility request 126 to the policy engine 110. The eligibility request 126 includes information relating to the user and/or the UE 102A, such as the IMSI or other identifying information.

At operation 808, the policy engine 110 checks with the user account data 112 to determine eligibility for unlocking.

At operation 810, the policy engine 110 receives eligibility data from the user account data 112 and approves or disapproves the SIM unlock request 122.

At operation 812, if the UE 102A is eligible and is approved for unlocking, the approval 128 is transmitted to the enterprise unlock server 108. As noted above, the approval 128 may be granted based on different reasons. For example, the policy engine 110 may determine that the cost of the UE 102A has been paid in full according to the user account data 112. In another example, the policy engine 110 may determine that the UE 102A has been associated and subscribed to the cellular carrier 114 for a certain number of days. The approval 128 may be generated for other reasons not specifically described herein.

At operation 814, the enterprise unlock server 108 transmits the SIM unlock response 130 to the UE 102A. If the UE 102A is capable of using the cellular carrier 114, the SIM unlock response 130 may be transmitted over the cellular carrier 114. If the UE 102A is not capable of using the cellular carrier 114, the SIM unlock response 130 may be transmitted over the Wifi network 120. Other types of communication means may be used and are considered to be within the scope of the presently disclosed subject matter.

At operation 816, the UE 102A issues an unlock notification 220 to the remote SIM unlock application 118 indicating the UE 102A has received instructions to unlock the UE 102A.

At operation 818, the remote SIM unlock application 118 sends to the SIM status application 106 a SIM unlock command 222. The SIM unlock command 222 is an instruction to have the SIM status application 106 change the unlock status of the UE 102A from locked to unlocked. In some examples, the SIM unlock command 222 is transmitted at 318 without requesting permission from a user. In other examples, the user is provided an indication of the receipt of the SIM unlock push command 116 and a selectable link in a user interface (as illustrated in FIGS. 4 and 5 above). The user can give the remote SIM unlock application 118 permission to proceed, deny the unlock command, or instruct the UE 102A to wait to unlock the UE 102A until a later time.

At operation 820, after the SIM status application 106 changes the status of the UE 102A from locked to unlocked, the SIM status application sends an unlocked indication 224 to the UE 102A.

At operation 822, the UE 102A sends an unlocked update 226 to the enterprise unlock server 108.

At operation 824, the enterprise unlock server 108 updates the user account data 112 by providing a user account update 228 to the user account data 112.

At operation 810, if the UE 102A is not eligible for unlocking, the process will be halted at operation 826, and a rejection notification may be transmitted to the UE 102A.

Based on the foregoing, it should be appreciated that technologies for integrating external data from an external system into a client system are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An enterprise unlock server of a first cellular network comprising:
    memory storing computer-executable instructions; and
    a processor in communication with the memory, the computer-executable instructions causing the processor to perform acts comprising:
        receiving, from a policy engine, a communication originating an unlock operation for a user equipment (UE) based on a change of user account data for the UE, the communication indicating eligibility of the UE to become unlocked for use on a second cellular network;
        determining, based on the communication from the policy engine, to unlock the UE using a push operation;
        in response to determining that the UE is to be unlocked using the push operation, transmitting a SIM unlock push command to the UE to cause a remote SIM unlock application on the UE to execute an unlock operation that unlocks the UE to allow the use of the UE with the second cellular network; and
        receiving, in response to the SIM unlock push command, a notification regarding an unlocked status of the UE.

2. The enterprise unlock server of claim 1, wherein the SIM unlock push command is transmitted by the enterprise unlock server to the UE or a third-party server to the UE.

3. The enterprise unlock server of claim 1, wherein the eligibility is determined by checking user account data to determine if the UE is eligible to be unlocked based on at least one of payment in full being made for the UE and the UE being subscribed to the first cellular network for a particular period of time.

4. The enterprise unlock server of claim 3, wherein the computer-executable instructions further cause the processor to perform further acts comprising:
    causing an installation of the remote SIM unlock application to the UE.

5. The enterprise unlock server of claim 1, wherein the notification comprises:
    a notification that a user of the UE has rejected the SIM unlock push command, or
    a notification that the user has requested to hold the SIM unlock push command to allow the user to unlock the UE at a later time.

6. The enterprise unlock server of claim 1, wherein the notification comprises:
    a notification from the UE indicating that the UE has been unlocked, wherein a locked status prevented the use of the UE with the second cellular network.

7. The enterprise unlock server of claim 1, the computer-executable instructions further causing the processor to perform further acts comprising:
    storing a user account update in user account data associated with the UE.

8. A method, comprising:
    determining, by a policy engine, a change in eligibility of a user equipment (UE) to become unlocked for use on a new cellular carrier;
    originating, by the policy engine, an unlock operation for the UE, comprising sending an approval to unlock the UE to an enterprise unlock server;
    causing a transmission of a SIM unlock push command to the UE to cause a remote SIM unlock application on the UE to execute an unlock operation that unlocks the UE to allow the use of the UE with the new cellular carrier; and receiving, in response to the SIM unlock push command, a notification regarding an unlocked status of the UE.

9. The method of claim 8, wherein the SIM unlock push command is transmitted by the enterprise unlock server to the UE or a third-party server to the UE.

10. The method of claim 8, wherein the notification comprises:
a notification that a user of the UE has rejected the SIM unlock push command, or
a notification that the user has requested to hold the SIM unlock push command to allow the user to unlock the UE at a later time.

11. The method of claim 10, wherein the approval is determined by checking user account data to determine the change in eligibility if the UE based on at least one of payment in full being made for the UE and the UE being subscribed to a first cellular carrier for a particular period of time.

12. The method of claim 8, further comprising:
causing an installation of the remote SIM unlock application to the UE.

13. The method of claim 8, wherein the SIM unlock push command is transmitted over a Wifi network if the UE is unable to communicate with an enterprise unlock server over a cellular network.

14. The method of claim 8, further comprising:
storing a user account update in user account data associated with the UE.

15. A system comprising:
memory storing computer-executable instructions; and
one or more processors in communication the memory, the computer-executable instructions causing the one or more processors to perform acts comprising:
determining, by a policy engine, a change in eligibility of a user equipment (UE) to become unlocked for use on a new cellular carrier;
originating, by the policy engine, an unlock operation for the UE, comprising sending an approval to unlock the UE to an enterprise unlock server;
causing a transmission of a SIM unlock push command to the UE to cause a remote SIM unlock application on the UE to execute an unlock operation that unlocks the UE to allow the use of the UE with the new cellular carrier; and
receiving, in response to the SIM unlock push command, a notification regarding an unlocked status of the UE.

16. The system of claim 15, wherein the SIM unlock push command is transmitted by the enterprise unlock server to the UE or a third-party server to the UE.

17. The system of claim 15, wherein the notification comprises:
a notification that a user of the UE has rejected the SIM unlock push command, or
a notification that the user has requested to hold the SIM unlock push command to allow the user to unlock the UE at a later time.

18. The system of claim 17, wherein the approval is determined by checking user account data to determine the change in eligibility based on at least one of payment in full being made for the UE and the UE being subscribed to a first cellular network for a particular period of time.

19. The system of claim 15, the computer-executable instructions further causing the one or more processors to perform further acts comprising:
causing an installation of the remote SIM unlock application to the UE.

20. The system of claim 15, wherein the SIM unlock push command is transmitted over a Wifi network if the UE is unable to communicate with an enterprise unlock server over a cellular network.

21. The system of claim 15, the computer-executable instructions further causing the one or more processors to perform further acts comprising storing a user account update in user account data associated with the UE.

* * * * *